United States Patent [19]

Mitchell et al.

[11] Patent Number: 4,497,544
[45] Date of Patent: Feb. 5, 1985

[54] OPTICAL IMAGING DEVICE AND METHOD

[75] Inventors: Gordon L. Mitchell, New Brighton; John H. Tressler, III, Plymouth, both of Minn.

[73] Assignee: Honeywell Inc., Minneapolis, Minn.

[21] Appl. No.: 453,446

[22] Filed: Dec. 27, 1982

[51] Int. Cl.³ .............................................. G02F 1/19
[52] U.S. Cl. .................................. 350/353; 350/359; 350/363
[58] Field of Search ............... 350/354, 359, 363, 353, 350/393; 374/121

[56] References Cited

U.S. PATENT DOCUMENTS

| 3,519,742 | 7/1970 | Bjelland. | |
| 4,190,811 | 2/1980 | Alcock et al. | |
| 4,249,796 | 2/1981 | Sincerbox et al. | 350/355 |
| 4,381,883 | 5/1983 | Yamamoto et al. | 350/164 |

OTHER PUBLICATIONS

Gordon, II; J. G. et al., "Electrochromic Attenuated Total Reflection Modulator", IBM Tech. Discl. Bull., vol. 22, No. 5, Oct. 1979, p. 2074.
Haruna; M. et al., "Thermo-Optic Effect in LiNbO₃ for Light Deflection and Switching", Electronics Letters, Oct. 29, 1981, vol. 17, No. 22, pp. 842-844.
Kurlansik; Henry, "Interrupted Total Internal Reflection Prism Shutter for Laser Beam Modulation", Tech. Notes No. 883, RCA, Princeton, N.J.
Gordon L. Mitchell, Senior Member, *IEEE Journal of Quantum Electronics*, vol. QE-13, No. 4, Apr. 1977, "Absorption Spectroscopy in Scattering Samples Using Integrated Optics".

*Primary Examiner*—Bruce Y. Arnold
*Attorney, Agent, or Firm*—William T. Udseth

[57] ABSTRACT

An optical imaging device includes an optical device comprising means for absorbing at least one wavelength of light incident thereupon, a first layer of a first material having a first index of refraction and being in thermal contact with the absorbing means, and a second layer of a second material having a second index of refraction which is larger than the first index of refraction and which forms an interface with the first layer. The first layer is placed between the absorbing means and the second layer. The phase, amplitude or both phase and amplitude of the reflected light can be modulated by thermally induced changes in the first index of refraction. A method of modulating a first optical beam with a second optical beam is also provided.

6 Claims, 8 Drawing Figures

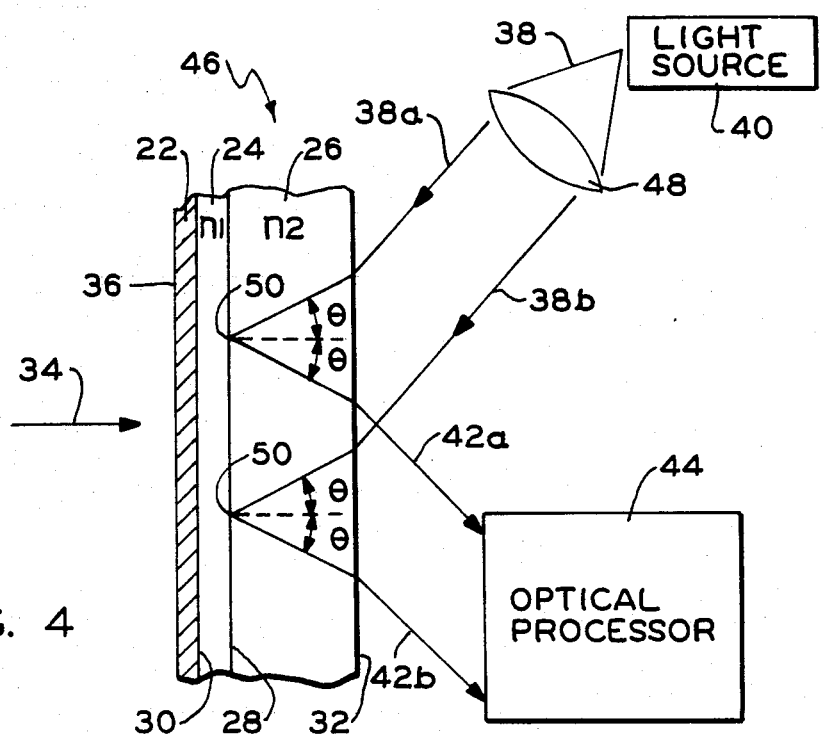
FIG. 4
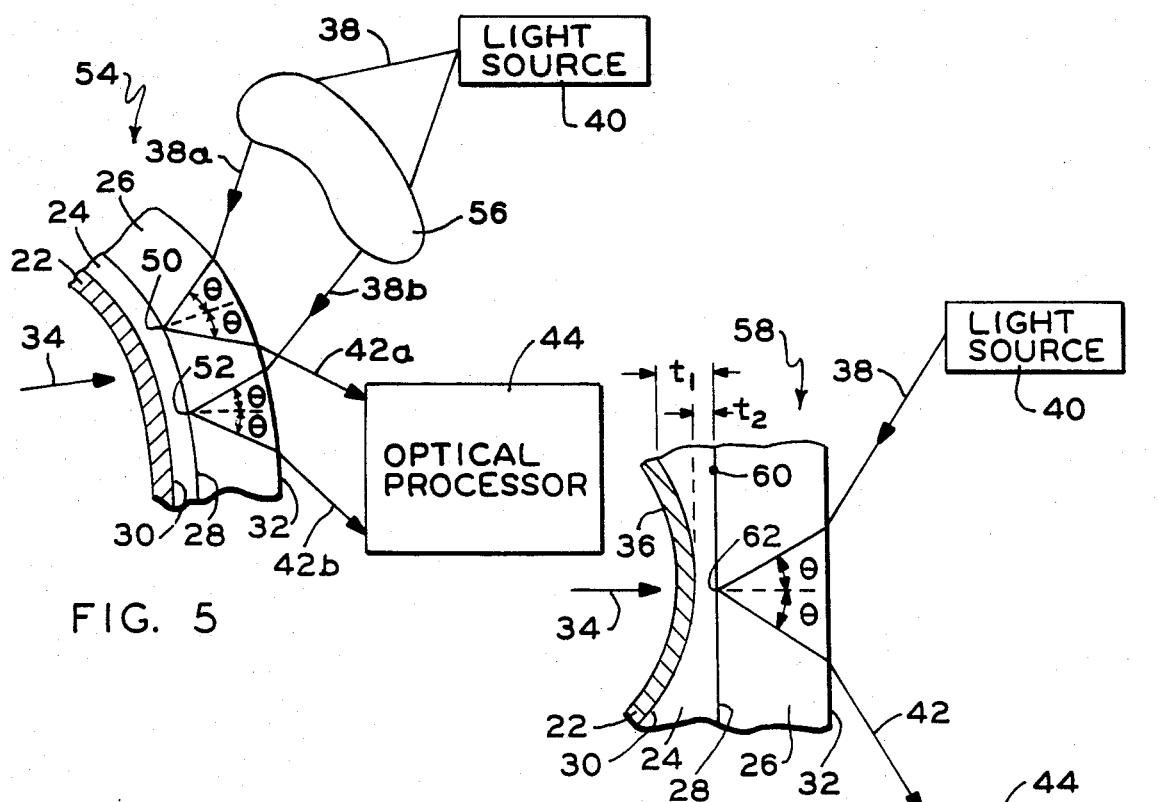
FIG. 5
FIG. 6

OPTICAL IMAGING DEVICE AND METHOD

BACKGROUND OF THE INVENTION

1. Field of the Invention

This invention relates to optical devices adapted to modulate a first optical signal due to absorption of at least one wavelength of a second optical signal by a material. In particular, changes in the index of refraction as a function of temperature are employed to modulate an optical signal which is totally internally reflected.

2. Description of Prior Art

Typical optical imaging systems can involve the components shown in FIG. 1, that is a detector array 12, readout means 14 coupled to array 12, an analog/digital conversion component 16 and a signal processor 18. System trade offs generally are simple when a few detectors are used. However, when many detectors, for example a focal plane array such as array 12, are employed the problem becomes a complex trade off of speed, resolution and dynamic range. Often optical signal processing provides an answer to the high throughput requirements of the system.

Nevertheless, connecting components may still be a problem. The detectors in array 12 are typically connected via charge coupled device (CCD) readouts (i.e. readout 14) to A/D converter 16. The digital data is then input to signal processor 18. Thus, at least one stage of optical/electrical conversion is involved, and if an optical signal processor is used as processor 18, the process is more complex due to the electrical/optical conversion required to render processor 18 operational.

Further, many optical processors 18 are adapted to process only coherent light. Thus means and methods for direct processing of an optical input signal (i.e. optical/optical processing) is desirable and direct conversion of an incoherent input beam to a coherent output beam is particularly desirable. The technique proposed herein to solve this conversion problem involves total internal reflection.

Total internal reflection has been used as a mechanism for absorption spectroscopy. Prior absorption spectroscopy devices have employed waveguides. Therein, a waveguide having a core of a first index of refraction and a cladding of a second index of refraction, where the second index of refraction is smaller than the first index of refraction, and wherein an absorptive sample is placed in contact with a surface of the core or in close proximity thereto so that the evanescent field of light propagating along the waveguide is partially absorbed by the sample, have formed the basis of a standard absorptive spectroscopy arrangement.

In such prior systems, the total absorption of the sample in close proximity to the waveguide varies because the concentration of absorptive particles or elements in the sample generally varies as the sample is flowed over the waveguide surface. Also, the output from such absorption spectroscopy devices is a sum of the effect on light propogated along the core which comes into close contact with the absorbing sample.

Heretofore, no means or method have been disclosed for providing an output which is sensitive to changes in the index of refraction of a cladding material at a total internally reflecting interface within a preselected area of the interface. This ability to differentiate effects within an area at the interface can provide the basis for adapting a totally internally reflecting device to function as an optical imaging mechanism.

SUMMARY OF THE INVENTION

This invention is an optical device which includes a means for absorbing at least one wavelength of light incident thereupon, a first layer of a first material having a first index of refraction and being in thermal contact with the absorbing means, and a second layer of a second material which forms an interface with the first material and has a second index of refraction which is larger than the first index of refraction. The first layer is placed between the absorbing means and the second layer.

A second optical beam can be adapted to illuminate a part of the interface at an angle which is near the critical angle for total internal reflection. The first index of refraction is a function of the temperature of the first material and thus, as the first material is heated due to the absorption of light by the absorbing means, the first index of refraction changes. This in turn varies the amplitude and phase of the reflected portion of the second optical beam. Thus the first optical beam can be used to modulate the second optical beam without optical/electrical signal conversion.

The second optical beam can be a coherent beam, thus affording incoherent to coherent optical conversion, or the present invention can be readily designed to perform infrared to visible optical conversion. Planar or curved focal planes of an optical device, or other geometries, can be used as part of the absorbing means to facilitate optical systems design.

A method of modulating a first optical beam with a second optical beam which is totally internally reflected is also disclosed.

BRIEF DESCRIPTION OF THE DRAWINGS

FIG. 4 is a schematic of a second embodiment of a device in accordance with the present invention.

FIG. 5 is a schematic of a third embodiment of a device in accordance with the present invention.

FIG. 6 is a schematic of a fourth embodiment of a device in accordance with the present invention.

DESCRIPTION OF THE PREFERRED EMBODIMENTS

Figure 1:
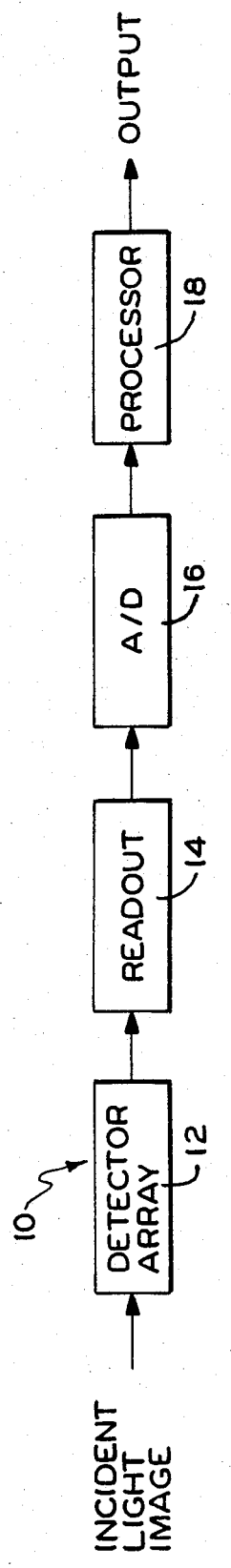
FIG. 1 is a schematic of a prior art optical imaging system.
Figure 2:
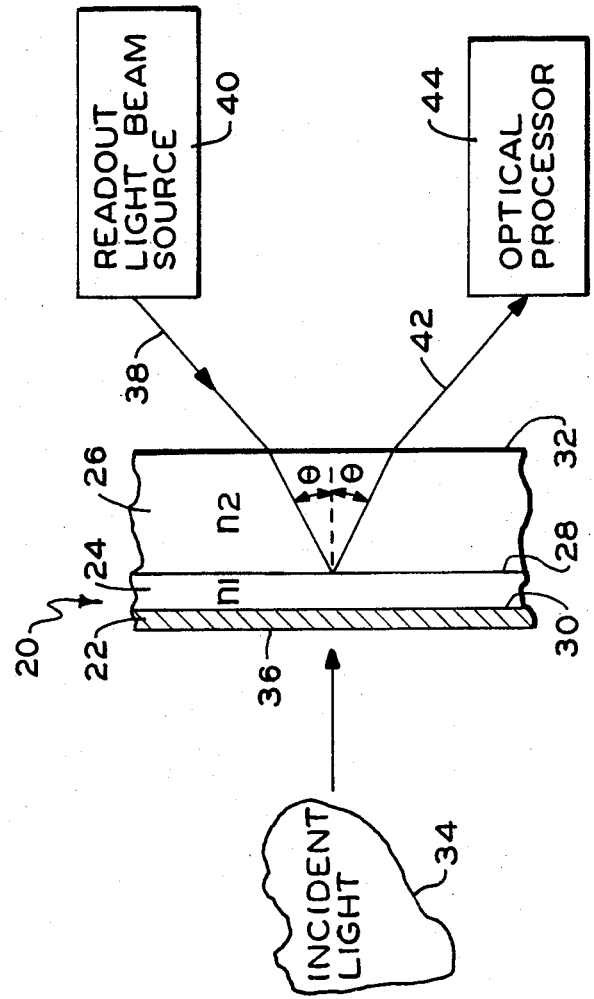
FIG. 2 is a schematic of a first embodiment of an imaging device in accordance with the present invention.

Optical imaging device 20 of FIG. 2 includes means for absorbing 22 at least one wavelength of light incident thereupon, and a first layer 24 of a material having a first index of refraction n1, a second layer 26 of material having a second index of refraction n2, n2>n1. Thus light striking interface 28 between layers 24 and 26 at an angle greater than or equal to the critical angle for total internal reflection (i.e. $\theta c$ where $\sin \theta c = n1/n2$) will be totally internally reflected into layer 26. Interface 28 forms a surface of both layers 24 and 26. Layers 24 and 26 each have surfaces 30 and 32, respectively, opposite interface 28. Layer 26 is further adapted so that light totally internally reflected from portions of interface 28 can be separately detected. This affords sensitivity to local phase and amplitude variations of such reflected light so that image processing can be realized.

Figure 3A:
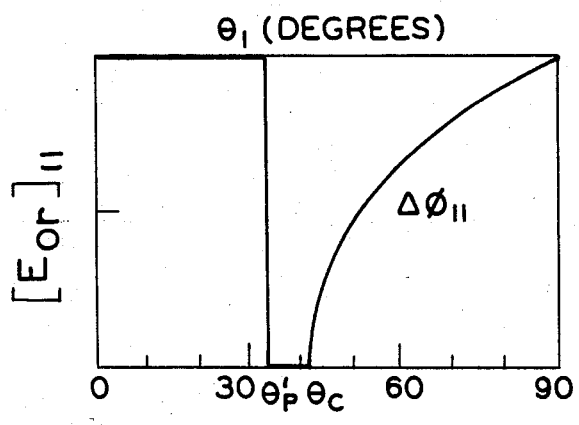
FIGS. 3a, b, and c are representative graphs of known changes in phase and amplitude for various angles of incidence of light on an interface capable of totally internally reflecting light.
Figure 3B:
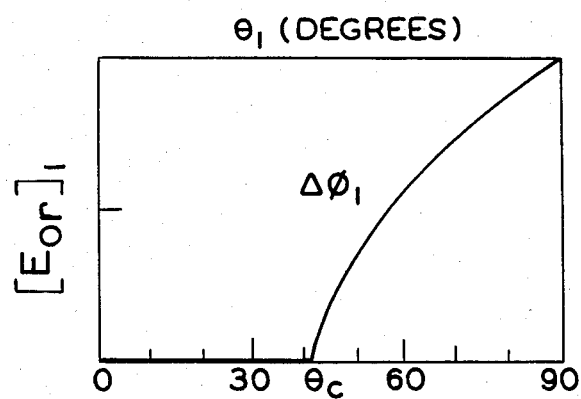
Figure 3C:
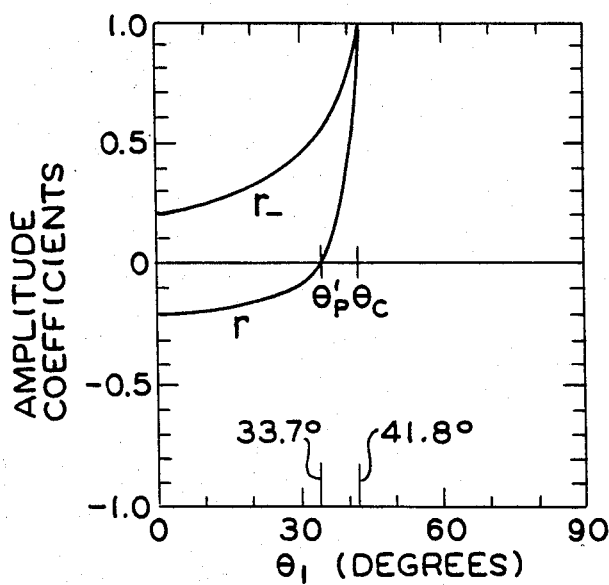

FIGS. 3a, b, and c are representative plots with indices n1 and n2 fixed. FIG. 3a shows the phase shift of the electric field component of totally internally reflected light which is parallel to an interface such as interface 28. FIG. 3b shows the phase shift of the electric field component of totally internally reflected light which is perpendicular to an interface such as interface 28. FIG. 3c shows amplitude variations of totally internally reflected light near the critical angle. Generally, as the ratio of the smaller index of refraction to the larger index of refraction increases, this is approximately equivalent to changing $\theta c$ and thus affording a change in amplitude and phase for the reflected portion of a beam incident on interface 28.

In operation device 20 receives an incident light image 34 on the exterior surface 36 of absorbing means 22. Since layer 22 absorbs at least one wavelength of the incident light 34, the temperature of absorbing means 22 will increase at least during absorption. Layer 24 (which should be in thermal contact with absorbing means 22 and which is shown in direct physical contact with absorbing means 22) is heated by conduction. Layer 24 should be of a material where n1 is a function of the temperature T of layer 24. Thus as layer 24 is heated, n1 changes (generally increasing) so that $\theta c$ changes.

A readout light beam 38 from light source 40 is adapted to be incident on interface 28 at an angle $\theta > \theta c$. As n1 varies due to a change in T, the phase and the amplitude of the reflected portion 42 of beam 38 varies. Beam 42 is thus modulated by input light 34. An optical processor 44 can be provided to directly receive beam 42. Thus device 20 forms the basis for an image processing system which is devoid of electronic interfaces.

Beam 38 can be a coherent light beam so that reflected portion 42 is coherent. Incoherent to coherent conversion is thus directly implemented.

If absorbing means 22 is adapted to absorb infrared light, infrared to visible conversion is provided. Absorbing means 22 can be a coating covering a portion of layer 24.

The most sensitive operation of device 20 will be achieved by maximizing the change in n1 with temperature (i.e. dn1/dT) and maximizing the variation in phase or amplitude of reflected readout beam 42 with a change in n1. Preferably layer 24 will be a low index material with a high dn/dT and layer 26 will be a high index material with a low dn/dT or a dn/dT of opposite sign to that of layer 24. Examples might be a low index plastic for layer 24 and a high index glass for layer 26. Materials possessing high internal polarization such a piezoelectrics are expected to be suitable high dn/dT materials.

As an example, the calculated change in phase of the parallel polarization component of a readout beam is approximately 0.002° for 9 nanojoules incident on an area of $10^{-4}$ cm in a device comprised of a polymethyl pentene (e.g. TPX manufactured by Mitsui Petrochemical Industries LTD., Tokyo) and a dense lanthanum flint glass (e.g. Schott LASF6 manufactured by Schott Optical Glass Inc., Duryea, Pa.).

It is also possible to use a low index material having a low thermal capacity as layer 24. This would minimize the image energy needed to affect a unit change in temperature in a unit of mass.

Preferably, $\theta$ is chosen to be very near $\theta c$ so that the slope of the phase (or amplitude) versus $\theta$ curve (see FIG. 3) is maximized. With this selection, the smallest variation in index of refraction would have the greatest impact on beam 42.

Also, layer 24 is preferably thin to insure rapid conduction of thermal energy from absorbing means 22 through layer 24. Good thermal contact at surface 30 is highly desirable.

For time-sampled applications of device 20, considerations of frame/cycle time and spatial resolution lead to system trade offs in selection of material thermal conductivity for layer 24. Rapid cycling implies the need to quickly dissipate the thermal pattern left by the previous frame's illumination. A high resolution implies a slowly dissipating thermal pattern and a low conductivity material is desirable.

For many applications, absorbing means 22 can be a detector array lying in the focal plane of a lens system (not shown).

Sometimes focal plane cooling is desired. Conventional focal plane detector arrays use wires to connect the focal plane with the external circuitry. Frequently these wires must pass through the walls of a cryogenic dewar. This is a significant problem because of the heat transferred along the wires. Since the optical readout of beam 42 in device 20 is through the air with no physical contact to the focal plane, heat transferred into the focal plane is minimized.

For heightened sensitivity, the input light 34 may be chopped.

Alternative embodiments of the present invention are presented in FIGS. 4, 5 and 6. Similar structure between these other embodiments and device 20 are numbered the same for clarity.

FIG. 4 shows a device 46 which modifies device 20 to allow detection of images over a two dimensional area. Device 46 adds a means for expanding 48 (i.e. collimating) readout beam 38 so that a plurality of parallel beams (e.g. 38a and 38b) strike interface 28 at a plurality of locations (see points 50 and 52). Thus, a plurality of reflected readout beams (e.g. 42a and 42b) will be fed to optical processor 44. If n1 is different at points 50 and 52 due to different amounts of light being absorbed at layer 22 near these points, readout beams 42a and 42b will be different in phase, amplitude or both phase and amplitude. In FIG. 4, optical processor 44 would be adapted to process beams 42a and 42b separately.

FIGS. 5 and 6 show embodiments of the present invention where the focal plane (i.e. absorbing means 22) is curved. Device 54 in FIG. 5 depicts layers 24 and 26 as each of uniform thickness. With a curved focal plane 22, a means for maintaining 56 the angle of incidence $\theta$ of all readout light beams (e.g. beams 38a and 38b) constant at interface 28 is required. Maintenance means 56 can be, for example, a specially shaped lens, a lens system or a holographic correction element. As is well known, a holographic correction element can be, for example, a photographic plate imprinted with the interference pattern of reflected light from focal plane 22 and a coherent reference beam. Focal plane 22 can be geometries other than a uniformly curved surface by adapting maintenance means 56 to accommodate the distinctive geometry.

FIG. 6 shows a device 58 wherein a nonplanar focal plane 22 is employed to provide the function of the present invention, but wherein layer 24 is not of uniform thickness. Instead surface 30 conforms to the shape of focal plane 22 while interface 28 is optically flat as in device 20. This configuration alleviates the need for maintenance means 56. However, the maximum thickness t1 of layer 24 at the extremes of the sensitive area of focal plane 22, will preferably be sufficiently small so that thermal images formed at a point 60 remote from a point 62 (point 62 being opposite focal plane 22 at the site of minimum thickness t2 of layer 24) will have sufficient resolution for the particular application of the output data.

A variation (not shown) of device 58 would have layer 24 of uniform thickness $t_2$ with surface 30 of focal plane (i.e. absorbing means) 22 being flat while surface 36 remains nonplanar.

What is claimed is:

1. An optical device comprising:
    means for absorbing at least one wavelength of light incident thereupon;
    a first layer of a first material having a first index of refraction and being in thermal contact with said absorbing means;
    a second layer of a second material having a second index of refraction which is larger than said first index of refraction and which forms an interface with said first layer, wherein said first layer is between said absorbing means and said second layer;
    a readout light source, which emits a coherent optical beam, adapted to illuminate at least a part of said interface at an angle which is greater than the critical angle for total internal reflection; and
    means to focus the incident light at a surface in space, and wherein at least a portion of said absorbing means intercepts said surface.

2. The device of claim 1 wherein said surface is a plane.

3. An apparatus for detecting light, comprising:
    means for absorbing at least one wavelength of said light;
    a first layer of first material having a first index of refraction;
    a second layer of second material which forms an interface with said first layer, is thermally coupled to said absorbing means, and has a second index of refraction which is a function of the temperature of said second layer and which is less than said first index for at least some temperatures of said second material; and
    a readout light source adapted to illuminate at least a portion of said interface at an angle which is greater than the critical for total internal reflection at said portion when said first index of refraction is larger than said second index of refraction.

4. The device of claim 3, wherein said readout light source is further adapted to illuminate said interface by passing light through said second layer to strike said interface at an angle which is greater than the critical angle for total internal reflection.

5. A method of modulating a first light beam with a second light beam, comprising:
    absorbing at least one wavelength of said second light beam in a first material;
    heating a second material having a first index of refraction which is a function of temperature with energy due to said absorbed wavelength; and
    illuminating at least a part of an interface between said second material and a third material, said third material having a second index of refraction which is larger than said first index of refraction for at least some temperatures, with said first light beam at an angle which is greater than the critical angle for total internal of reflection, so that the phase and amplitude of that portion of said first light beam reflected from said interface is modulated as said critical angle is altered due to variations of said first index of refraction induced by changes in the temperature of said second material.

6. The method of claim 5 wherein said first light beam is coherent light.

* * * * *

UNITED STATES PATENT AND TRADEMARK OFFICE
CERTIFICATE OF CORRECTION

PATENT NO. : 4,497,544
DATED : FEBRUARY 5, 1985
INVENTOR(S) : GORDON L. MITCHELL, ET AL

It is certified that error appears in the above-identified patent and that said Letters Patent is hereby corrected as shown below:

Claim 3, column 6, line 12, after "critical"

insert --angle--.

Signed and Sealed this

Twenty-eighth Day of May 1985

[SEAL]

Attest:

DONALD J. QUIGG

Attesting Officer     Acting Commissioner of Patents and Trademarks